United States Patent [19]
Hersbt

[11] Patent Number: 5,295,802
[45] Date of Patent: Mar. 22, 1994

[54] DEMOLDING APPARATUS

[76] Inventor: Richard Hersbt, Freisinger Str. 3, D-8507 Eching, Fed. Rep. of Germany

[21] Appl. No.: 938,156
[22] PCT Filed: May 22, 1991
[86] PCT No.: PCT/EP91/00955
 § 371 Date: Nov. 30, 1992
 § 102(e) Date: Nov. 30, 1992
[87] PCT Pub. No.: WO91/18728
 PCT Pub. Date: Dec. 12, 1991

[30] Foreign Application Priority Data

Jun. 1, 1990 [DE] Fed. Rep. of Germany ....... 4017796

[51] Int. Cl.$^5$ .................. B29C 43/50; B29C 45/42
[52] U.S. Cl. ..................... 425/139; 249/67; 249/68; 264/334; 425/422; 425/436 RM; 425/444; 425/556
[58] Field of Search ............ 425/139, 556, 403.1, 425/436 R, 444, 436 RM, 438, 422; 264/334; 249/66.1, 67, 68

[56] References Cited

U.S. PATENT DOCUMENTS

| 3,801,486 | 3/1963 | Skvorc | 425/444 |
| 4,571,320 | 2/1986 | Walker | 425/444 |
| 4,620,958 | 11/1986 | Wiechard | 425/444 |
| 4,732,554 | 3/1988 | Hellmann | 425/556 |
| 4,781,571 | 11/1988 | Heindl et al. | 425/556 |
| 4,787,841 | 11/1988 | Simon | 425/556 |
| 5,112,558 | 5/1992 | Schad et al. | 425/444 |

FOREIGN PATENT DOCUMENTS

| 3624677 | 1/1988 | Fed. Rep. of Germany . | |
| 62-85919 | 4/1987 | Japan | 425/556 |
| 63-4923 | 1/1988 | Japan | 425/556 |
| 1-139225 | 5/1989 | Japan . | |
| 1523378 | 11/1989 | U.S.S.R. . | |
| 1494192 | 12/1977 | United Kingdom . | |

*Primary Examiner*—Khanh Nguyen
*Attorney, Agent, or Firm*—Chilton, Alix & Van Kirk

[57] ABSTRACT

A gripper (2) for removing a molded workpiece (9) from the opened mold (1, 3) of a molding machine is coupled through a step-up drive transmission with the ejector (13, 15, 17) associated with the mold in such a manner that the ejector causes it to execute a movement away from the ejector in the same direction of motion as the ejector. The drive transmission can in particular have co-operating limit stops (45, 43) on the ejector and on the gripper, and one of these limit stops is mounted on a drive step-up lever (37). In another embodiment, the step-up drive transmission is designed as a hydraulic transmission.

20 Claims, 4 Drawing Sheets

DEMOLDING APPARATUS

BACKGROUND AND SUMMARY OF THE INVENTION

The invention relates to a demolding apparatus for a molding machine. Such demolding apparatuses are used in particular in the case of injection-molding machines for the production of plastic moldings, but can also be used in molding machines of other types, such as for example diecasting machines, molding presses and the like.

With such a demolding apparatus, the demolding operation proceeds as follows: firstly, the mold is opened by moving the mold halves apart. Then the gripper is made to run into the opened mold. Subsequently, the ejector carries out its ejecting stroke, so that the molding is partially moved out of the mold cavity by means of one or more ejector pins and brought into the gripping region of the gripping member, so that it can be grasped by the gripping member. Then the moving away movement is carried out by the gripper or the gripping member—in relation to the gripper—parallel to the direction of ejection, in order to release then completely from the mold cavity the molding held by the gripping member and also lift it off the ejector pins. This moving away movement of the gripper can also begin already before the ejector has reached the end point of its ejecting stroke. After carrying out the moving away movement, the running out movement of the gripper transversely to the direction of ejection can then be performed, by which the molding held by the gripping member is moved out of the mold into a position where the molding can be removed for further treatment or further transport. The various movement operations of the mold, of the gripper and of the ejector must be carefully coordinated with one another and carried out partly with time overlap, in order on the one hand to avoid time loss and achieve a high cycle rate of the machine, but on the other hand to eliminate with certainty the risk of mutual hindrance of these movements and of damage to the moving parts, even in the case of drive malfunctions.

In the case of the hitherto customary demolding apparatuses of this type, a separate drive is required for carrying out the moving away movement of the gripper or of the gripping member parallel to the direction of ejection, said drive being provided in addition to the drives for opening and closing the mold, for actuating the ejector and for the running in and out of the gripper. This drive for the moving away movement constitutes an additional constructional expenditure, which makes the overall apparatus more expensive and also more susceptible to malfunctions. The components of this drive to be fitted on the gripper or gripping member increase the mass to be moved each time the gripper is run in and out. The main problem is, however, to control the drive for the moving away movement in optimum time coordination with the movements of the ejector drive and the other drives in such a way that least possible time losses occur and highest possible cycle rates of the molding machine are possible.

In the case of drives to be activated separately, unavoidable time losses occur owing to the response times and switching times of the associated switches, signal generators and the like and to the required acceleration times.

The object of the invention is to design an apparatus of the said type in such a way that it is simplified in terms of construction and control and permits an optimum and loss-free coordination of the moving away movement of the gripping member with the ejecting movement of the ejector.

The way in which the object is achieved according to the invention is by providing a demolding apparatus for removing a molding from a molding machine. The demolding apparatus comprises a gripper for entering the molding machine when the molding machine is in a open position, an ejector for injecting the molding in a direction of injection, an ejector drive acting on the ejector for carrying out an ejecting stroke, and means for moving the gripper, or the gripping member which forms part of the gripper, together with the molding, in a direction parallel to the direction of ejection and away from the ejector. The ejector drive is coupled, at least during the final part of the ejecting stroke, to one of the gripper and the gripping member by means of a drive transmission. The drive transmission has a step-up ratio greater than one.

The invention dispenses with the need for a separate drive for the moving away movement of the gripping member, and this moving away movement is controlled by direct drive transmission from the ejector drive. A considerable constructional simplification is attained as a result. Time losses due to response times and switching times cannot occur.

Embodiments of the invention are explained with reference to the drawings in which:

DETAILED DESCRIPTION OF THE PREFERRED EMBODIMENT

Figure 1:
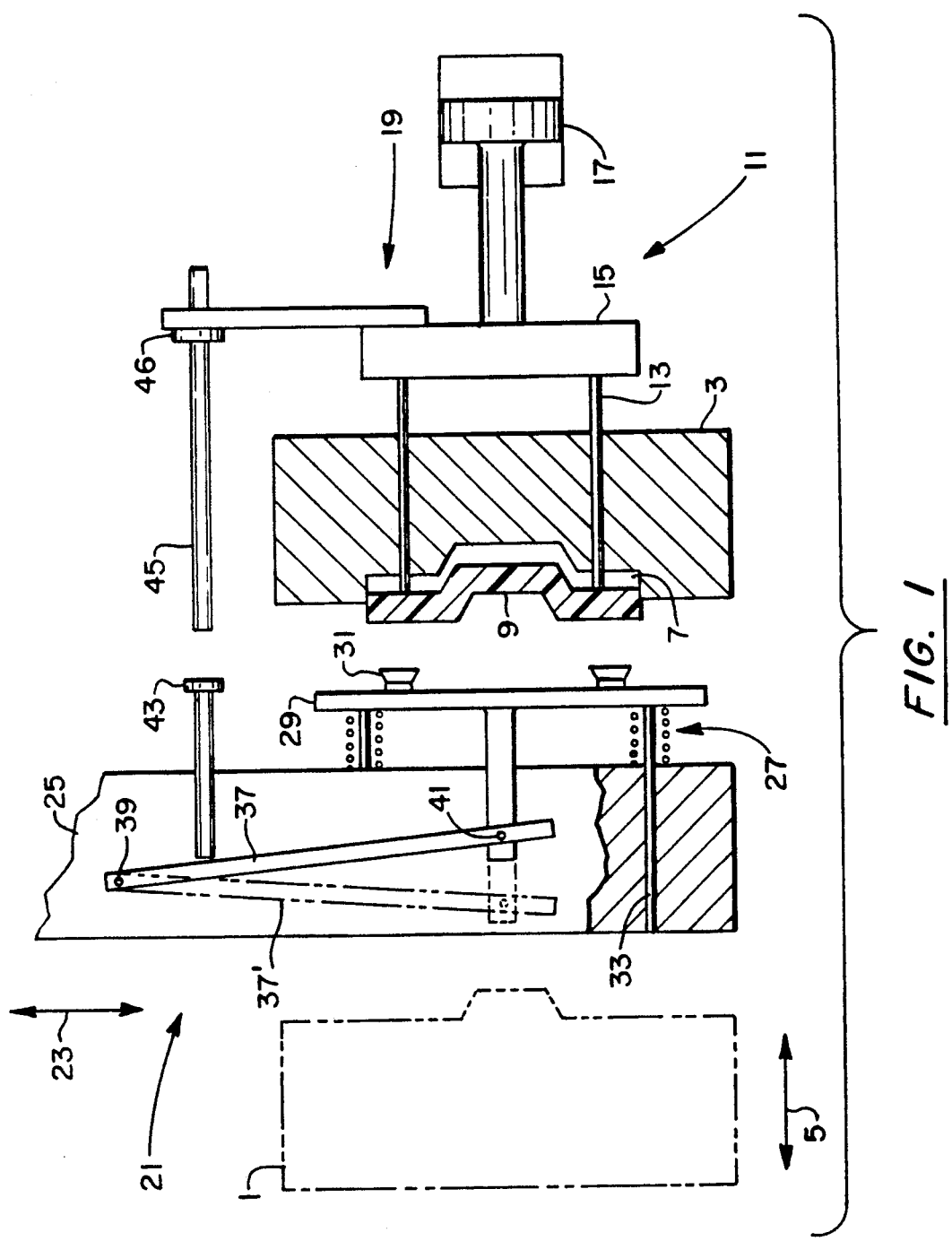
FIG. 1 shows a simplified block diagram, partly in section, of a demolding apparatus according to a first embodiment.

In FIG. 1, the two mold halves of a mold of an injection-molding machine or other molding machine are represented by 1 and 3 and are movable in relation to each other in the direction of the arrow 5 in order to close or open a mold cavity 7. With the mold open, a molding 9, for example an injection molding, molded in the mold cavity 7, can be ejected by means of the ejector 11 from the mold cavity 7. The ejector 11 comprises ejector pins 13, which are borne by an ejector plate 15, which can be moved back and forth in the direction of the arrow 19 by means of an ejector drive 17, for example a hydraulic cylinder.

Between the opened mold halves 1, 3, a gripper 21 can be made to run in and out in the direction of the arrow 23. The gripper 21, which may be part of a separate handling device, robot or the like, comprises a gripper arm 25, on which a gripping member 27 is movably mounted. The gripping member 27 comprises a gripper plate 29, which bears suckers 31 which face the molding 9 and are connected to a vacuum source (not shown). The gripper plate 29 is mounted displaceably o the gripper arm 25 by means of guide pins 33. Instead of the suckers 31, other gripping elements known per se, for example for mechanical gripping of the molding 9, may also be provided.

The movement of the gripping member 27 can be controlled by means of a lever arm 37, which is mounted on the gripper arm 25 in a swivel bearing 39 and is connected at its end to the gripper plate 29 via a joint 41. At a point lying between the bearing 39 and joint 41, the lever arm 37 bears a stop 43, on which a push rod 45, connected to the ejector plate 15, can act.

The apparatus operates as follows: after opening of the mold halves 1, 3, or already during the opening movement, the gripper arm 25 is made to run in the direction of the arrow 23 between the mold halves 1, 3. When the gripper arm 25 has reached its end position, or already during the last part of the running-in movement, the ejector drive 17 begins to actuate the ejector plate 15 in the direction of arrow 19 for the ejecting stroke, so that the ejector pins 13 engaging the molding 9 release the latter from the bottom of the mold cavity 7 and move it in the direction of the suckers 31 of the gripping member 27, until the molding 9 bears against the suckers 31 and is held by them. This takes place at a point in time at which the molding 9 has not yet completely lost contact with the mold half 3.

On continued movement of the ejector plate 15 in the direction of ejection 19, the push rod 45 comes to bear against the stop 43, so that then the lever arm 37 is moved and turned into the position 37, indicated by dot-dashed lines. As a result, the gripping member 27 is moved together with the gripped molding 9 in the direction of the arrow 19 further away from the mold half 3 and closer to the gripper arm 25. On account of the different lever arm lengths between the stop 43 and the lever bearing 39 or between the joint 41 and the lever bearing 39, in this process the movement of the gripping member 27 is performed at greater speed than the movement of the ejector plate 15. Push rod 45, stop 43 and lever arm 37 consequently represent a stepping-up (transmission ratio greater than 1) drive transmission between the ejector drive 17 and the gripping member 27. Consequently, during the last part of the ejecting stroke of the ejector drive 7, the gripping member 27 carries out a moving away movement parallel to the direction of ejection 19. Since this is performed at greater speed than the ejecting movement of the ejector pins 13, the molding 9 gripped by the gripping member 29, 31 is not only moved completely out of the mold cavity 7, but also lifted off the ejector pins 13, so that, on the subsequent running out movement of the gripper arm 25, it can then be moved along oppositely to the direction of arrow 23, without being hindered in the process by the mold half 3 or the ejector pins 13. In the run-out position of the gripper arm 25, the gripping member 29, 31 can then be returned into the advanced position, before or after removal of the molding 9. For this purpose, the running-out position of the gripper arm 25 may be assigned returning elements (not shown), which are designed either as fixed stops or guides or as active elements and act on the gripper plate 29 in the sense of returning movement.

The push rod 45 is, of course, arranged offset with respect to the mold cavity 7, perpendicularly to the plane of the drawing of FIG. 1, in such a way that it does not hinder the running out of the gripper 25 with the molding 9. The push rod 45 also need not be taken laterally past the mold half 3, as shown, but may be taken through the mold half 3 by means of a guide. In order to change the point in time of impact of the push rod 45 against the counter-stop 43 or the extent of the moving away movement of the gripping member 29, 31, the push rod 45 and/or the counter-stop 43 may be designed to be adjustable. As an example of such an adjustable arrangement, it is shown in FIG. 1 that the push rod 45 is guided adjustably in a holding means 48 and can be fixed in its position by a nut 46.

Figure 2:
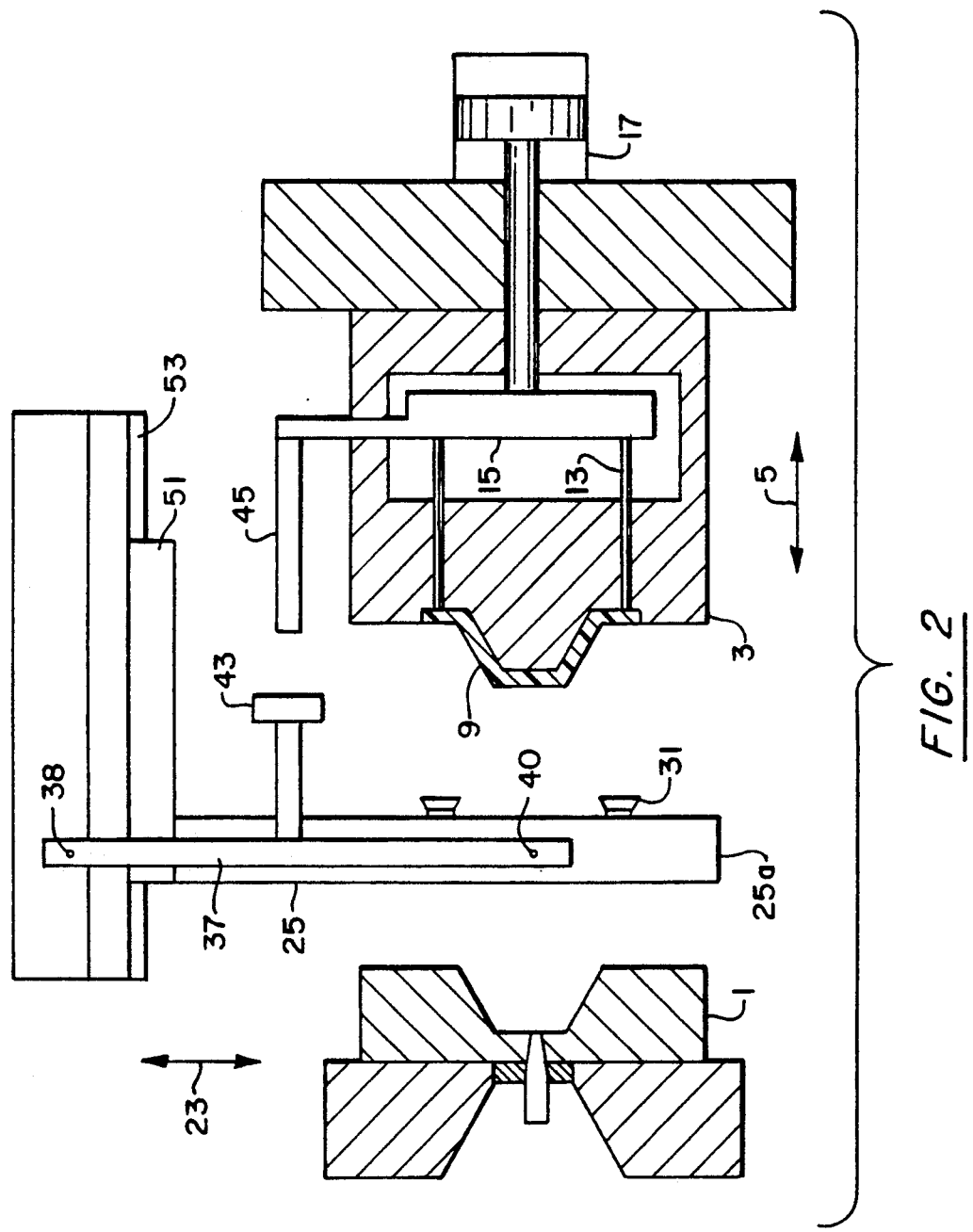
FIG. 2 shows a second embodiment in a similar representation.
Figure 3:
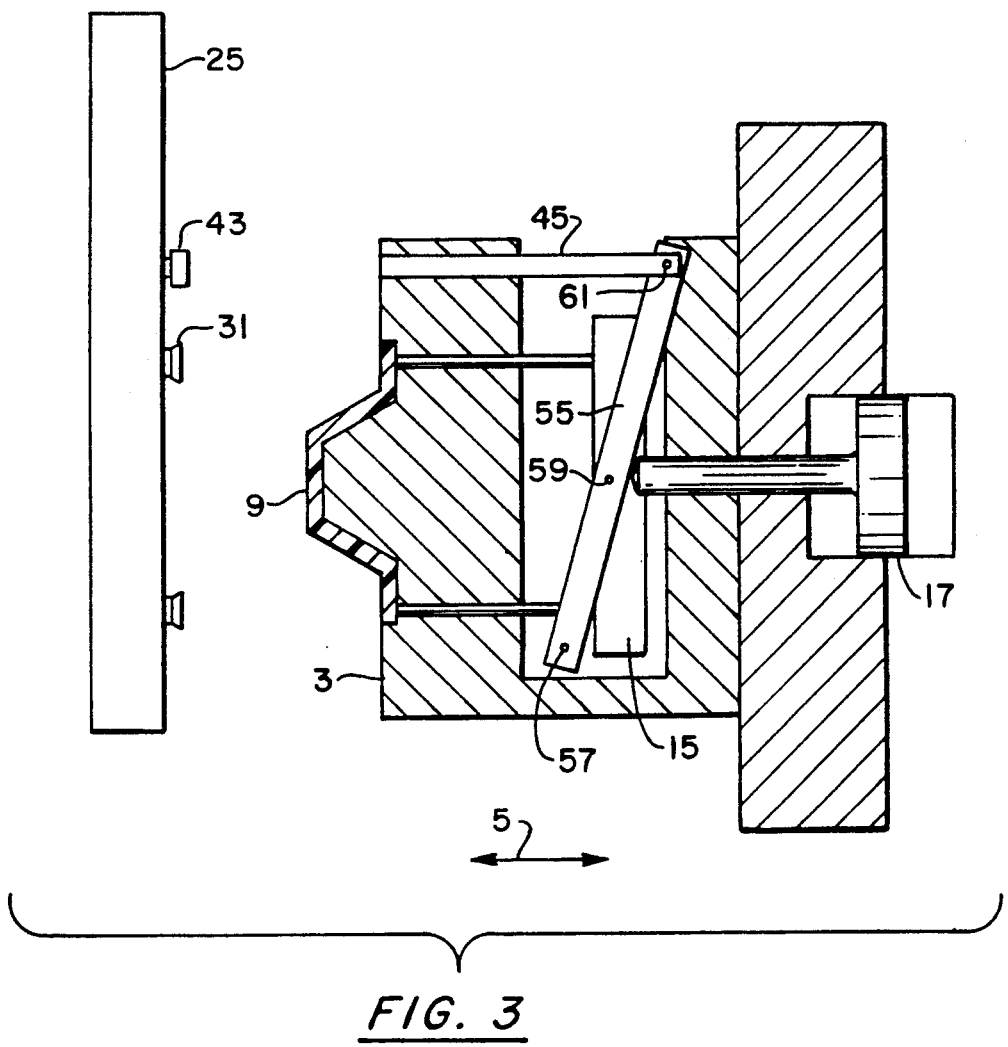
FIGS. 3 and 4 show two further embodiments in a still further simplified representation.
Figure 4:
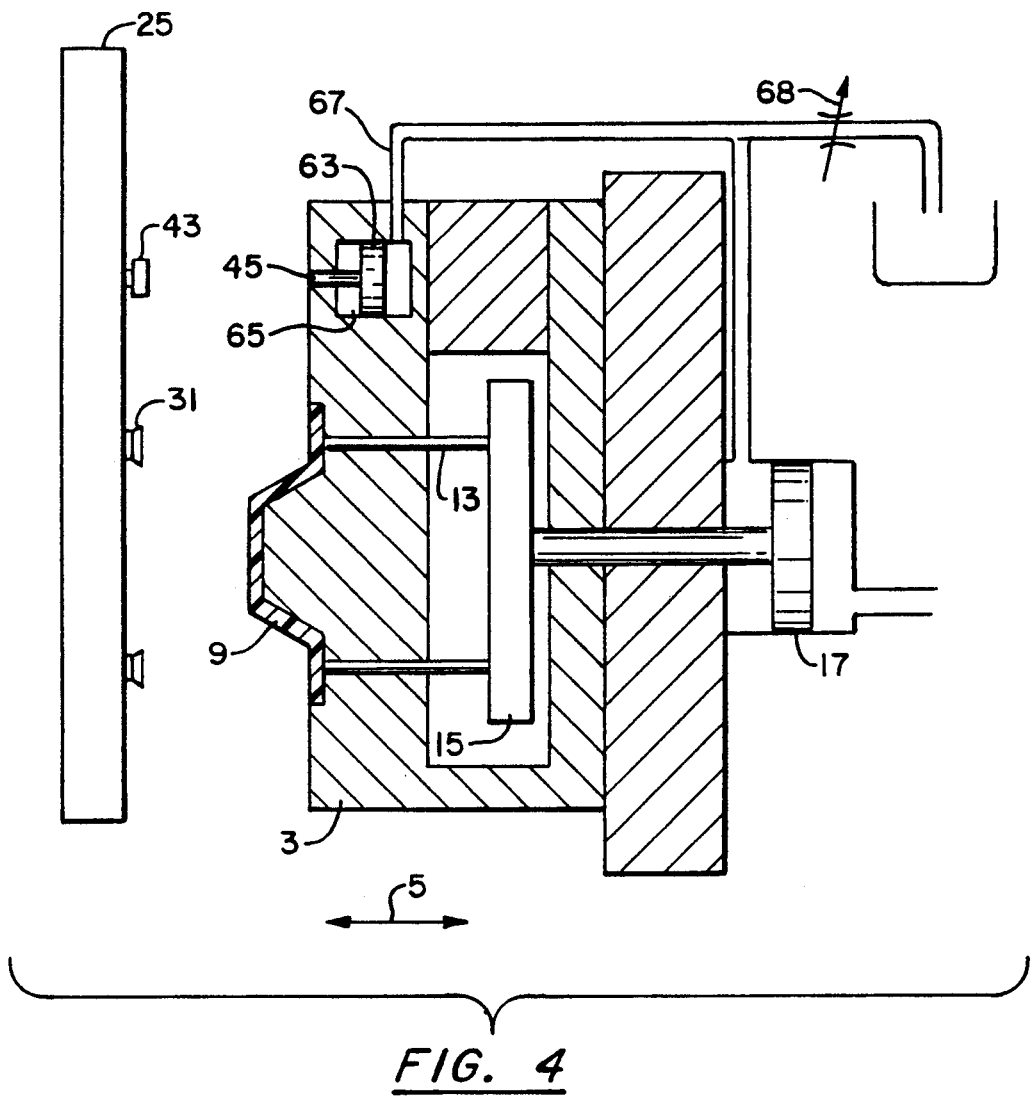

Departing from the embodiment according to FIG. 1, the entire gripper arm 25 may be mounted movably parallel to the direction of ejection and execute the moving up movement. A separate movable mounting means of the gripper member on the gripper arm is then not required. Furthermore, the drive-stepping-up lever linkage need not be provided on the gripper, but may also be located on the mold side between the ejector drive 19 and the push rod 45. The drive transmission also need not be designed as a mechanical linkage, but may also be designed, for example, in the form of a hydraulic coupling. Such different embodiments are represented in FIGS. 2 to 4, which are described below. In this description, parts which have already been described with reference to FIG. 1 and are provided with the same reference symbols are not explained again.

In the case of the embodiment according to FIG. 2, the gripper arm 25 is displaceable by means of a guide carriage 51 in a guide 53 parallel to the direction of arrow 5. In the running-in and running-out direction 23 of the gripper arm 25, the guide 53 can be moved together with the gripper arm 25 by means of a drive (not shown). On a lever 37, which is mounted on the guide and on the gripper arm such that it can swivel at 38 and 40, there is located a counter-stop 43, against which a push rod 45, moved by the ejector plate 15, comes to bear during the ejecting movement of the ejector. As a result, a moving away movement of the entire gripper arm 25 parallel to the direction of ejection is effected, the lever arm 37 providing for a stepping up of the drive. In the case of this embodiment, a gripping member mounted movably on the gripper arm 25 is not required, rather the end section 25a of the gripper arm 25 forms the gripping member, to which the suckers 31 or other gripping elements are directly attached.

In the case of the embodiment according to FIG. 3, just as in FIG. 2 the entire gripper arm 25 is mounted movably parallel to the direction of ejection 5 (not shown in FIG. 3). Mounted rigidly on the ejector arm 25 is the counter-stop 43, against which the push rod 45 acts. However, unlike in the case of the embodiments according to FIGS. 1 and 2, the push rod 45 is not rigidly connected to the ejector plate 15, which can be actuated by the ejector drive 17. Instead, a lever 55 is provided, the one end of which is mounted at 57 on the mold 3, and which is connected jointedly in its central region at 59 to the ejector plate 15. At the other end, the lever 55 is connected jointedly at 61 to the push rod 45. When the ejector drive 17 moves the ejector plate 15 in the direction of ejection, this movement is transmitted via the lever 55 with stepping-up to the push rod 45, so that the latter moves forward more quickly than the ejector plate 15 and the molding 9 and during the course of the ejecting stroke meets the counter-stop 43, so that then the gripper arm 25 executes the moving away movement to the left in FIG. 3 together with the molding gripped by the suckers 31.

Also in the case of the embodiment according to FIG. 4, the entire gripper arm 25 is mounted displaceably (not shown) parallel to the direction of arrow 5 and bears a fixedly arranged counter-stop 43. On the latter there acts a push rod 45, which is mounted on the mold 3 and can be driven hydraulically by means of a piston 63 and hydraulic cylinder 65. The ejector drive 17 is—as also in the case of the embodiments according to FIGS. 1 to 3 —designed as a hydraulic cylinder, and a line 67 connects the rod-side working space of the hydraulic cylinder 67 to the piston-side working space of the hydraulic cylinder 65. The effective cross section of the hydraulic cylinder 65 is less than that of the hydraulic cylinder 17. If pressure medium is admitted to the piston-side working space of the drive cylinder 17, in order to carry out the ejecting stroke of the ejector plate 15 and of the ejector pins 13, the pressure medium displaced out of the rod-side working space of the cylinder 17 is forced into the piston-side working space of the cylinder 65, so that the piston 63 is displaced to the left in FIG. 4 with push rod 45, so that it strikes the counter-stop 43 and, by means of the latter, drives the gripper arm 25 to the left for the moving away movement. The different cross-sectional surface areas of the drive cylinders 17 and 65 produce a stepping-up of movement, so that the advancing movement of the piston 63 and of the push rod 45 is performed at greater speed than the advancing movement of the ejector plate 15 and of the ejector pins 13.

Further modifications and refinements are possible within the scope of the principle of the invention. For example, the hydraulic drive transmission according to FIG. 4 may also be used if not the entire gripper arm 29 but a gripping member mounted movably on the gripper arm carries out the moving away movement, as in the case of the embodiment according to FIG. 1. Also, for example in the case of the embodiment according to FIG. 1, the coupling of the counter-stop 43 with the gripper plate 29 could be performed not mechanically by means of a lever 37 but, for example, hydraulically. Also, the gripper may be equipped with a drive by which an approaching movement up to the molding 9 or stop 45 is executed.

In an advantageous refinement of the invention, in the case of the embodiments according to FIGS. 1 to 3, the push rod 45 and/or the counter-stop 43 can be combined with spring elements and/or shock absorbers, so that an abrupt striking of the push rod 45 against the counter-stop 43 is prevented or cushioned and deadened.

In a further refinement of the invention, it may be provided that the stepping-up ratio of the transmission is variable. For example, in the case of using a stepping-up lever according to FIGS. 1 to 3, one of the bearing points 39, 40, 41 of the lever 37 may be designed adjustably in such a way that the stepping-up ratio is changed by altering the effective lever arm length. In the case of the hydraulic transmission according to FIG. 4, there may be connected to the connecting line 67 a branch with an adjustable restricting point 68, by which an adjustable part of the hydraulic fluid flowing through the line 67 can be drained off, so that the quantity of hydraulic fluid flowing to the cylinder 65 is adjustable.

The invention has been represented with reference to the exemplary embodiments only in conjunction with one ejector and one gripper. It is, of course, also applicable if the same mold is assigned a plurality of grippers, for example for removing a plurality of moldings from a multi-cavity mold. Furthermore, the invention is applicable in the case of multi-level molds, in which a plurality of molds, in each case provided with ejector systems, are arranged one after the other in the manner of levels and a plurality of grippers can be made to run in between the opened molds. In the case of all such systems operating with a plurality of grippers, in application of the invention each gripper or each gripping member can be driven by the respectively assigned ejector system by a corresponding stepping-up drive transmission for the moving out movement.

I claim:

1. A demolding apparatus for removing a molding from a molding machine which is adjustable between a closed position and at least one open position, the demolding apparatus comprising a gripper for entering the molding machine when th molding machine is in an open position, including a gripping member, an ejector for ejecting the molding in a direction of ejection, an ejector drive acting on the ejector for carrying out an ejecting stroke, the ejecting stroke having at least an initial part and a fall part, and molding withdrawal means for moving at least one of the gripping member and the gripper together with the molding in a direction parallel to the direction of ejection for carrying out a moving away movement of the molding from the ejector, the molding withdrawal means including a drive transmission coupling the ejector drive, at least during the final part of the ejecting stroke, to one of the gripper and the gripping member, the drive transmission having a stepping-up ratio greater than 1 for enhancing the moving away movement of the molding from the ejector.

2. The apparatus as claimed in claim 1, wherein the gripping member is movably mounted on the gripper in a direction parallel to the direction of ejection and the drive transmission includes means for carrying out the moving away movement.

3. The apparatus as claimed in claim 1, wherein ejection occurs at a first ejecting speed, and the molding withdrawal means includes a stop which is movable by the drive transmission in a direction parallel to the direction of ejection and which, during the ejecting stroke of the ejector, comes to bear against and moves along a counter-stop connected to one of the gripper and the gripping member, the ejector drive being connected to the stop by the drive transmission, which drives the stop at greater speed than the first ejecting speed of the ejector.

4. The apparatus as claimed in claim 1, wherein ejection occurs at a first ejecting speed, and the molding withdrawal means includes a stop and a counter-stop, the stop being movable by the ejector drive in the direction of ejection and which during the ejecting stroke of the ejector comes to hear against and moves along a counter-stop, the counter-stop being connected to one of the gripper and gripping member by the drive transmission, which drives the one of the gripper and the gripping member at greater speed than the speed of the stop.

5. The apparatus as claimed in claim 4, wherein the drive transmission comprises a pivotally mounted lever, by which the counter-stop is connected at a first distance from the pivot axis and the gripper or the gripping member is connected at a second, greater distance from the pivot axis.

6. The apparatus as claimed in claim 3, wherein the drive transmission comprises a pivotally mounted lever, which the ejector drive engages at a first distance from the pivot axis and which is connected at a second, greater distance from its pivot axis to the stop.

7. The apparatus as claimed in claim 3, wherein the ejector drive has a first hydraulic cylinder, and the apparatus has a second hydraulic cylinder for moving the stop in a direction parallel to the direction of ejection, wherein the effective cross-sectional surface area of the second hydraulic cylinder is less than that of the first hydraulic cylinder and wherein the apparatus includes a connection line for displacement of a pressure medium from the first hydraulic cylinder to the second hydraulic cylinder.

8. The apparatus as claimed in claim 1, wherein the stepping-up ratio of the drive transmission is adjustable.

9. The apparatus as claimed in claim 4 wherein at least one of the stop and the counter-stop is adjustable in relation to the other of the stop and the counter-stop.

10. The apparatus as claimed in claim 3, wherein at least one of the stop and the counter stop includes at least one of a spring element and a shock-absorbing element.

11. A apparatus for removing a molding from a molding machine which is adjustable between a closed position and at least one open position, comprising:

a gripper for entering the molding machine when the molding machine is in an open position, the gripper including a gripping member for gripping the molding, ejector means for ejecting the molding in a first direction, ejector drive means for driving the ejector means in an ejecting stroke having an initial part and a final part, an molding withdrawal means for moving the gripper or gripping member together with the molding away from the ejector means in a direction parallel to the first direction, the molding withdrawal means including drive transmission means for coupling the ejector means to the gripper during at least the final part of the ejecting stroke, the drive transmission means having a stepping-up ratio greater than 1 for enhancing the movement of the molding away from the ejector.

12. The apparatus as claimed in claim 11, wherein the gripping member is movably mounted on the gripper in a direction parallel to the first direction and is movable relative to the gripper by the drive transmission in order to move the gripping member away from the ejector in a direction parallel to the first direction.

13. The apparatus as claimed in claim 11, wherein ejector occurs at a first ejecting speed, and the molding withdrawal means comprises a stop which is movable in a direction parallel to the first direction by the drive transmission, and, during ejection, the stop bears against and move along a counter-stop which is connected to one of the gripper and gripping member, the ejector drive means being connected to the stop by the drive transmission means in order to drive the stop at a greater speed than the first ejecting speed of the ejector means.

14. The apparatus as claimed in claim 11, wherein the molding withdrawal means comprises a stop which is moved by the ejector drive, and which, during ejection, bears against and moves along a counter-stop, which is connected to one of the gripper and gripping member by the drive transmission means in order to drive the one of the gripper and gripping member at a greater speed than the speed of the stop means.

15. The apparatus as claimed in claim 14, wherein the drive transmission means comprises a pivotally mounted lever, by which the counter-stop means is connected at a first distance from the pivot axis and the gripper or the gripping member is connected at a second, greater distance from the pivot axis.

16. The apparatus as claimed in claim 13, wherein the drive transmission means includes a pivotally mounted lever which the ejector drive means engages at a first distance from the pivot axis and which is connected at a second, greater distance from its pivot axis to the stop.

17. The apparatus as claimed in claim 13, wherein the ejector drive means has a first hydraulic cylinder, and the apparatus has a second hydraulic cylinder for moving the stop in a direction parallel to the first direction, the effective cross-sectional surface area of the second hydraulic cylinder being less than that of the first hydraulic cylinder, and wherein the apparatus includes a connection line for displacing a pressure medium from the first hydraulic cylinder to the second hydraulic cylinder.

18. The apparatus as claimed in claim 11, wherein the stepping-up ratio of the drive transmission is adjustable.

19. The apparatus as claimed in claim 13, wherein at least one of the stop means and the counter-stop means are adjustable in relation to the other of the stop means and the counter-stop means.

20. The apparatus as claimed in claim 13, wherein at least one of the stop means and counter-stop means includes at least one of a spring element and a shock-absorbing element.

* * * * *

UNITED STATES PATENT AND TRADEMARK OFFICE
CERTIFICATE OF CORRECTION

PATENT NO. : 5,295,802
DATED : March 22, 1994
INVENTOR(S) : Richard Herbst

It is certified that error appears in the above-indentified patent and that said Letters Patent is hereby corrected as shown below:

On the title page, item [76], change "Hersbt" to --Herbst--.

Claim 1, column 6, line 11, change "th" to --the--.

Claim 1, column 6, line 16, change "fall" to --final--.

Claim 4, column 6, line 49, change "hear" to --bear--.

Claim 11, column 7, line 28, change "an" to --and--.

Claim 13, column 7, line 46, change "ejector" to --ejection--.

Signed and Sealed this

Twenty-third Day of August, 1994

Attest:

BRUCE LEHMAN

*Attesting Officer*  *Commissioner of Patents and Trademarks*